US006406302B1

(12) United States Patent
Nelson

(10) Patent No.: US 6,406,302 B1
(45) Date of Patent: Jun. 18, 2002

(54) SYSTEM AND METHOD FOR COLLECTING AND EXCHANGING SURVEY DATA

(76) Inventor: Webb Nelson, 19180 144th Ave., NE., Woodinville, WA (US) 98072

( * ) Notice: Subject to any disclaimer, the term of this patent is extended or adjusted under 35 U.S.C. 154(b) by 0 days.

(21) Appl. No.: 09/503,464

(22) Filed: Feb. 14, 2000

(51) Int. Cl.[7] .................................................. G09B 7/00
(52) U.S. Cl. ....................... 434/322; 434/350; 434/351; 434/362; 273/429; 273/430
(58) Field of Search ................... 434/236, 237, 434/322, 323, 350, 351, 353, 362; 273/429, 430, 431; 700/90

(56) References Cited

U.S. PATENT DOCUMENTS

| | | | | |
|---|---|---|---|---|
| 5,496,175 A | * | 3/1996 | Oyama et al. | 434/118 |
| 5,572,421 A | * | 11/1996 | Altman et al. | 395/203 |
| 5,920,845 A | * | 7/1999 | Risemberg | 705/1 |
| 5,950,200 A | * | 9/1999 | Sudai et al. | 707/9 |
| 6,181,910 B1 | * | 1/2001 | Jerrold-Jones et al. | 434/353 |

OTHER PUBLICATIONS

"Rules to... Scattergories". Milton Bradley Company. 1988. [online]. Retrieved from the Internet Mar. 1, 2000 URL<http://www.gamesters.org/Rules/Scattegories.html>.*

* cited by examiner

*Primary Examiner*—Joe H. Cheng
*Assistant Examiner*—Julie Kasick
(74) *Attorney, Agent, or Firm*—LaMorte & Associates

(57) ABSTRACT

A system and method of gathering and exchanging information between individuals. The system uses survey questionnaires that query a person about a variety of topics. The system can be a software application. However, in a preferred embodiment, the system is embodied by two hand-held electronic assemblies that prompt survey questions to a user and collect answers from the user. After two users have answered the same survey, they join the electronic assemblies they used to answer the survey. The electronic assemblies contain microprocessors that exchange the survey data with one another and analyze the data embodied by the survey answers.

15 Claims, 4 Drawing Sheets

SYSTEM AND METHOD FOR COLLECTING AND EXCHANGING SURVEY DATA

BACKGROUND OF THE INVENTION

1. Field of the Invention

The present invention relates to hand-held electronic data collection devices. More particularly, the present invention relates to hand-held data collection devices that can interface and exchange data with other hand-held data collection devices.

2. Description of the Prior Art

Hand-held data collection devices are used for many different purposes. For example, hand-held data collection devices with barcode scanners are used by delivery companies to track the pick-up and delivery of envelopes and packages. Personal hand-held "palm top" computers are used by many individuals to store information, such as appointments, addresses, phone numbers and the like.

Many such hand-held data collection devices have the ability to interface with other computers. As such, data gathered by the hand-held data collection device can be downloaded to a larger computer for analysis. The concept of data exchange between hand-held devices, however, has only recently crossed over from business applications to amusement applications. In the world of amusement devices, only recently have small hand-held video games become popular. Some of these hand-held video games have the ability to interconnect with other video games, thereby enabling two people with two video games to play against each other simultaneously.

The application of microprocessor technologies into small electronic devices and games have given people the ability to collect and transfer data with one another in an extremely rapid fashion. It is therefore easier than ever for people to exchange relevant information with one another. However, there is one area of information that is communicated by people in an extremely slow fashion. That area is personal information, such as information about a person's likes, dislikes, wants and needs. When people meet, they exchange personal information with one another either orally or through observed behavior. For instance, when two people meet for the first time, they typically exchange names and then perhaps enter into polite conversation. Even if those people were to become friends, it may take years before each person has a good understanding of the likes and dislikes of the other.

Discussing personal information is awkward for many people. When a person applies for a job, that person supplies a resume. The resume provides the potential employer with the basic personal information needed for the employer to ascertain the skills of the applicant and to ask relevant follow-up questions. However, when two individuals meet for the first time, very little personal information is exchanged. Two people who meet each other may have a great deal in common, however, if polite conversation does not approach those topics, neither person will ever know of their similarities.

A need therefore exists for some type of system that can be used for strangers and recent acquaintances to exchange personal information with each other in an unawkward fashion. In this way, people will be able to tell if they have many things in common with the person they have just met. This information can therefore lead to conversations about the common interests and provide people with interesting and relevant conversations.

This need is met by the present invention as it is described and explained below.

SUMMARY OF THE INVENTION

The present invention is a system and method of gathering and exchanging information between individuals. The system uses survey questionnaires that query a person about a variety of topics. The system can be a software application. However, in a preferred embodiment, the system is embodied by two hand-held electronic assemblies that prompt survey questions to a user and collect answers from the user. After two users have answered the same survey, they join the electronic assemblies they used to answer the survey. The electronic assemblies contain microprocessors that exchange the survey data with each other and analyze the data embodied by the survey answers.

Through the analysis of the survey data, two people can quickly ascertain what personal preferences, personality quirks and/or cultural similarities that share with the other person. Using this information, polite conversation can be directed to topics of mutual interest. Two basic strangers can therefore be provided with a quick insight into the other's personality without having to engage in a prolonged awkward conversation about themselves.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE INVENTION

The present invention has a method of operation that can be embodied in a software-based system. As such, the present invention can be embodied in many different systems that are capable of dynamically running software. For example, the present invention system can be manufactured as software that can be run on personal computers. However, it is believed that the present invention system is best embodied in a small hand-held electronic device having hardware and software dedicated to the invention's method of operation. Accordingly, by way of example, the present invention system and method will be described as embodied in a dedicated hand-held electronic device. Such an exemplary embodiment only represents the best mode contemplated for the present invention and is not intended to limit the scope of the invention.

Figure 1:
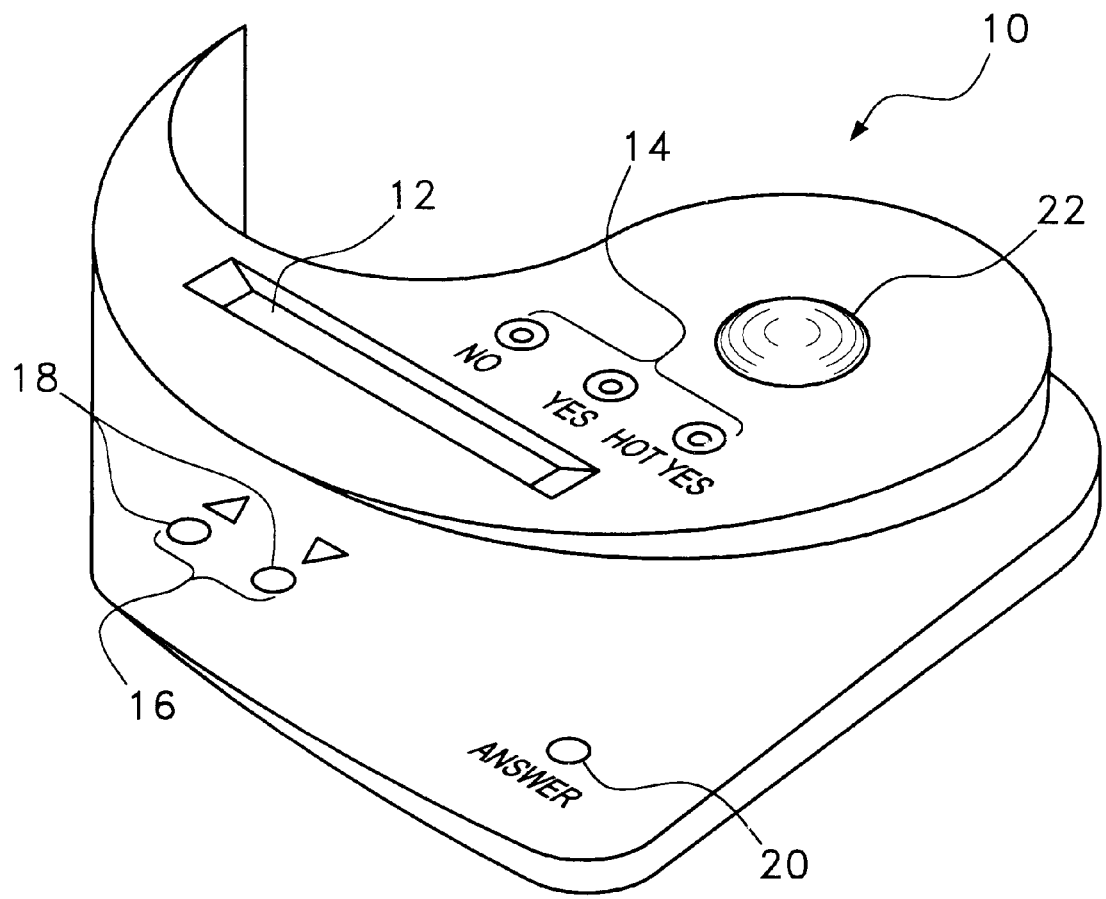
FIG. 1 is a perspective view of a single hand-held electronic assembly in accordance with the present invention.

Referring to FIG. 1, an exemplary embodiment of a hand-held electronic assembly 10 is shown. The electronic assembly 10 contains a display 12 that is capable of displaying alpha-numeric characters. As will later be explained, the display 12 is used to display questions to the user of the assembly 10.

Also on the electronic assembly 10 is a bank of answer lights 14 and an answer button 20. The answer button 20 and bank of answer lights 14 are use to select answers to questions that are displayed on the display 12.

The electronic assembly 10 displays questions on the display 12. The questions share the same multiple choice answers. The answer button 20 is used to toggle between the various multiple choice answers. The answer lights provide a visual indication as to which of the multiple choice answers is currently selected.

The answer lights 14 provided on the electronic assembly 10 correspond to the multiple choice answers. In the shown embodiment, there are three answer lights. Each of the three answer lights is associated with a specific multiple choice answer. In the shown embodiment, all of the questions queried by the device 10 have the same four multiple choice answers. Those answers are "no comment", "no", "yes" and "hot yes". The "no comment" answer is the default answer. Accordingly, if none of the answer lights 14 are lit, the selected answer is "no comment". However, by pressing the answer button 20, a person can change the selected answer to "no", "yes" or "hot yes", as is desired.

The three shown answer lights 14 are associated with the answers "no", "yes" and "hot yes". As a person changes the answer of a question from the default answer of "no comment" to "no", "yes" or "hot yes", the answer light 14 corresponding to the newly selected answer becomes illuminated. In this manner, a person has a visual indication as to the multiple choice answer they have selected.

The use of the four multiple choice answers described is merely exemplary and it will be understood that many other answers can be used. The number of multiple choice answers available is also exemplary. Any number of multiple choice answers can be used. The number of answer lights 14 on the assembly would also vary with the number of multiple choice answers. For example, questions can be prompted on the display that ask a person to agree or disagree with a statement on a scale of one-to-ten. In such a scenario, it would be practical to provide ten answer lights on the face of the assembly, wherein the answer lights would correspond to the answers one through ten.

Also present on the front of the electronic assembly 10 is a selection interface 16. In the shown embodiment, the selection interface 16 has two scroll buttons 18. The two scroll buttons 18 are used to scroll through a series of questions that are displayed one at a time on the display 12. Once a questions is presented on the display 12, the answer button 20 is used to select the multiple choice answer of that question. The selected answer is shown on the display 12. The answer selection is also confirmed by the lighting of the answer lights 14. Once a particular question is properly answered, as indicated by the answer lights 14, a user presses the scroll button 18 to scroll to the next question. The answer to the previous question is stored in memory.

Figure 2:
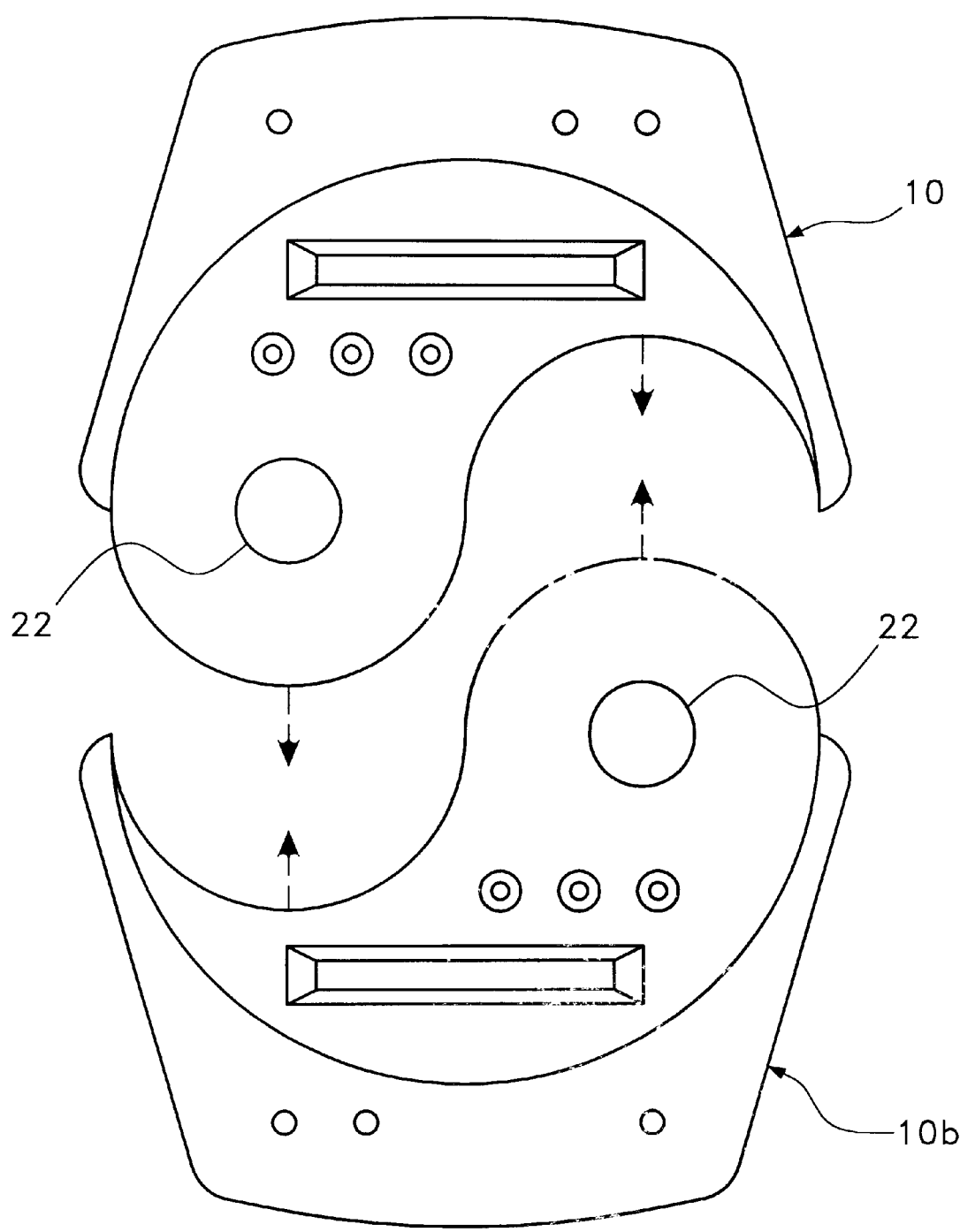
FIG. 2 is top view of two hand-held electronic assemblies shown just prior to interconnecting.

A data exchange button 22 is provided on the face of the electronic assembly 10. The data exchange button 22 is used to transmit the stored answers to questions from one electronic assembly to another, as is explained below. Referring now to FIG. 2, it can be seen that the electronic assembly 10 is designed to interconnect with a second electronic assembly 10b of the same design. In the shown embodiment, the two electronic assemblies 10, 10b create a yin-yang design when interconnected. However, such a design shape is arbitrary and it should be understood that many other designs can be used.

As two of the electronic assemblies 10, 10b are connected, an electrical interconnection is made. By pressing the data exchange button 22, data stored in one of the electronic assemblies can be transferred to the other and vice versa.

Figure 3:
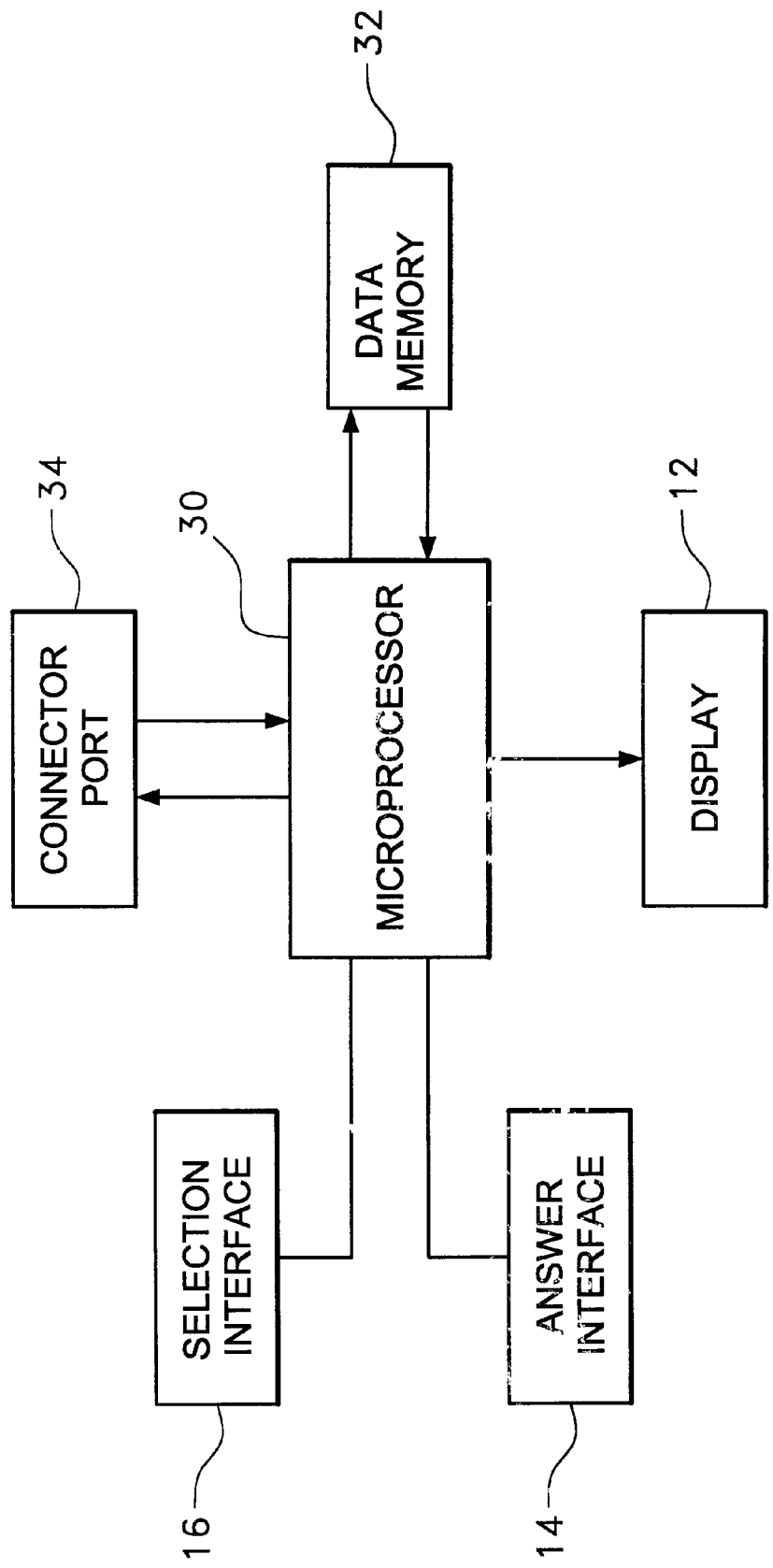
FIG. 3 is a schematic illustrating the components of an electronic assembly, such as that shown in FIG. 1 and FIG. 2.

Referring to FIG. 3, it can be seen that within each electronic assembly is a microprocessor 30. The microprocessor 30 controls the display 12. Furthermore, the microprocessor 30 is coupled to a data memory 32 that stores both the questions prompted to the user and the answers received from the user. Questions are queried through the microprocessor 30 via the buttons contained within the selection interface 16. Answers to the questions are received via the answer button 20 and the use of the answer lights 14. All answers entered by a user are stored in the memory 32 by the microprocessor 30.

The microprocessor 30 is coupled to a connector port 34. When two of the electronic assemblies are interconnected, such as is illustrated in FIG. 2, the connector ports 34 of the two assemblies interconnect and the microprocessor 30 of one assembly then becomes capable of communicating with the microprocessor of the other. The transfer of data between two separate assemblies is dependent upon the use of the data exchange button 22 (FIG. 2).

Figure 4:
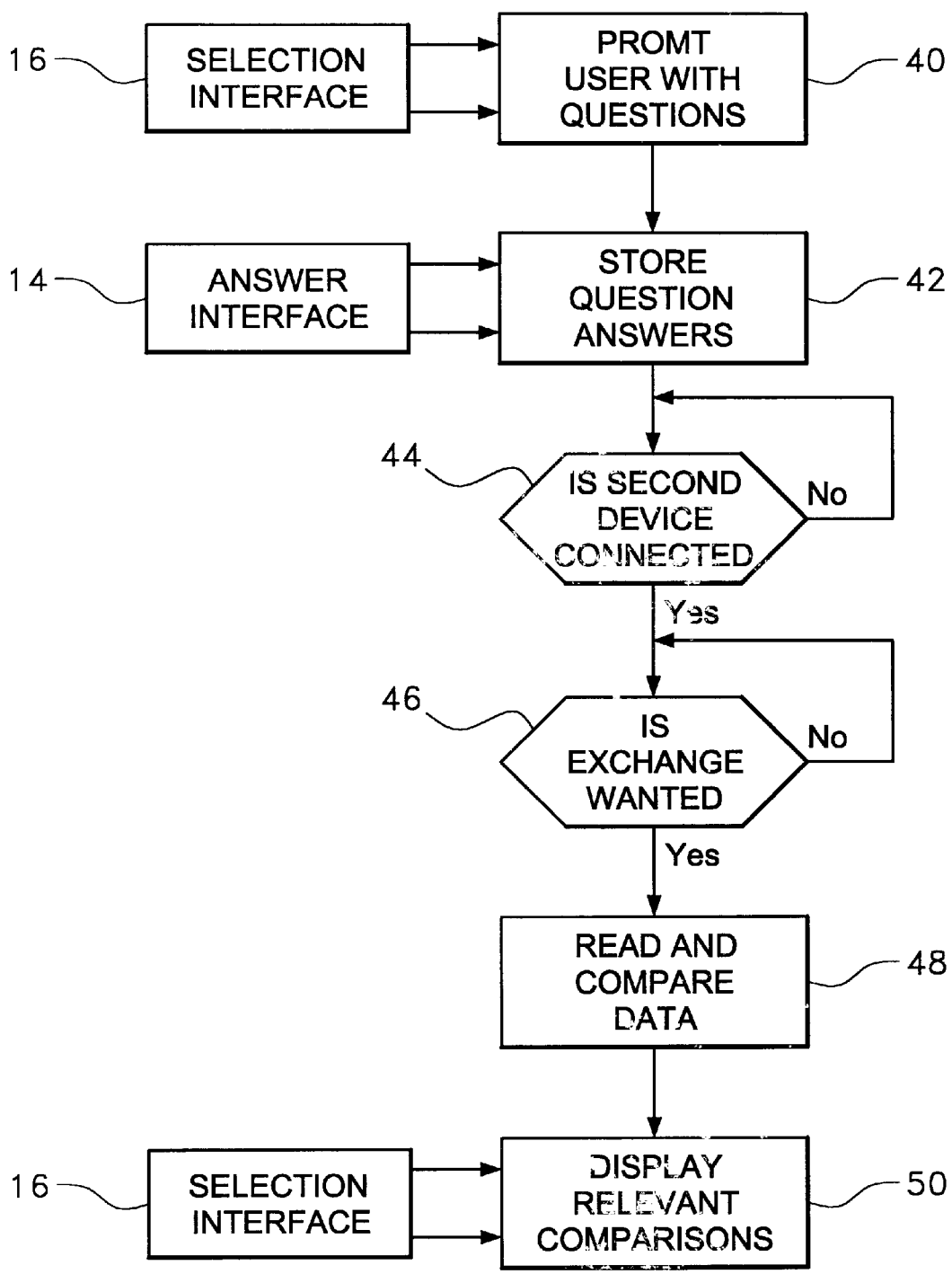
FIG. 4 is a block diagram illustrating the logic flow of the present invention system and method.

The purpose of the present invention system is to provide people with a fun and interesting way to exchange personal information about themselves with strangers or recent acquaintances. By referring to FIG. 4, the method of operation for the present invention system can be explained. As is indicated by Block 40, after the electronic assembly 10 (FIG. 1) is turned on, it displays a series of questions or statements to the person holding the assembly. The questions typically are of a personal nature and are designed to provide insight into a person's personality. Any questions can be used. However, the questions selected preferably share the same selection of multiple choice answers. Examples of such questions are as follows: "Do you like baseball?", "Are you religious?", "Would you ever cheat in school?". The number of questions is limitless and depends upon the discretion of the system's designer. The questions can also be made age appropriate. Mild questions can be used with children, while more mature or tawdry questions can be used with adults.

A person answering the questions can scan through the questions using the scroll buttons 18 in the selection interface 16. Once at a question, the answer button is used to select a multiple choice answer. The multiple choice answer selected is shown on the display 12 and is indicated by the lighting of the various answer lights 14. Once the correct multiple choice answer is selected, a user can scroll to the next question and the previous answer is stored.

As is indicated by Block 42, once an answer is selected by a user, the answer is stored within the memory 32 (FIG. 3) of the system. The process of answering questions continues until all prompted questions are answered. At any time during or after the question answering process, one system can be connected to a second system (see Block 44). If two systems are interconnected, the systems wait to be instructed to exchange information. As is indicated by Block 46, an exchange is assumed to be wanted when the data exchange button 22 (FIG. 2) on at least one of the systems is pressed.

Once question answer data is transferred from one system to another system, the microprocessor 30 (FIG. 3) in each of the systems runs a software application that compares the answer data stored in the memory of the two systems. As is indicated by Block 48, the comparison of data performed by the microprocessors may compare answer data by their similarities or dissimilarities. After the answer data comparison is completed, the results of the data comparison can be selectively displayed, as is indicated by Block 50. The data comparison results can be displayed in a number of different formats. The data comparison results are too large to be displayed at one time on the small display 12 (FIG. 1) of the system. Accordingly, by using the buttons of the selection interface 16, a person can scroll through the data comparison results.

By reviewing the data comparison results, a person can tell if they have a lot or a little in common with another person. By reviewing what common traits are shared, two people can discuss topics for which they have the same mindset. Conversely, two people can discuss topics for which they have completely opposite viewpoints in order to have a more lively discussion.

The purpose of the present invention system is to "break the ice" when two people meet who are strangers or recent acquaintances. The system enables people to learn about another's likes and dislikes and provides some insight into their personality within a matter of minutes. The system is therefore very useful in social settings, business conferences and other situations where people are expected to mingle with strangers and make new acquaintances.

In the embodiment of the present invention shown in FIG. 1, FIG. 2 and FIG. 3, the system was illustrated as a hand held system with dedicated components. Such a system is merely exemplary. The present invention system can be loaded as software onto any pre-existing system, such as a personal computer, that has a microprocessor, a display and a data input interface. Data can be exchanged between different systems by directly networking the systems, exchanging disks between systems or accessing different systems over the Internet.

It will therefore be understood that a person skilled in the art can make numerous alterations and modifications to the shown embodiment utilizing functionally equivalent components to those shown and described. All such modifications are intended to be included within the scope of the present invention as defined by the appended claims.

What is claimed is:

1. A method of gathering and exchanging data between two individuals, comprising the steps of:
   providing a first individual and a second individual with separate electronic assemblies that electronically display identical questionnaires;
   collecting answers to said questionnaires from the first and second individual;
   physically connecting each of said electronic assemblies together;
   instructing each of said electronic assemblies to exchange said answers to said questionnaires with the other to identify identical answers and non-identical answers between the first and second individual;
   displaying at least said identical answers to the first and second individual.

2. The method according to claim 1, wherein each of said electronic devices has a data input interface.

3. The method according to claim 2, wherein said step of collecting answers to said questionnaires includes the substep of prompting the first individual and the second individual to enter answers to said questionnaires into said electronic assemblies via said data input interface.

4. The method according to claim 2, wherein said questionnaires contain questions that can be answered from a plurality of predetermined answers and said data input interface includes at least one button for selecting from said plurality of predetermined answers.

5. The method according to claim 1, wherein each of said electronic assemblies has an electronic display and said step of displaying at least said identical answers includes the substep of displaying at least said identical answers on said electronic display of each of said electronic assemblies.

6. A method of exchanging survey data, comprising the steps of:
   providing a first individual and at least one other individual with electronic assemblies capable of receiving answers to survey questions;
   prompting the first individual and said at least one other individual with survey questions through said electronic assemblies, wherein the first individual and said at least one other individual answer said survey questions through said electronic assemblies;
   exchanging answers to said survey questions between said first individual and said at least one other individual by physically connecting the electronic assembly of the first individual with the electronic assemblies of said at least one other individual, one at a time.

7. The method according to claim 6, further including the step of analyzing answers received by one of said electronic assemblies from another.

8. The method according to claim 7, wherein said step of analyzing answers includes comparing answers entered into an electronic assembly by the first individual with answers received by that electronic assembly by another individual and indicating at least which answers are identical.

9. The method according to claim 8, further including the step of indicating which answers are not identical.

10. The method according to claim 7, wherein each of said electronic devices has a data input interface.

11. The method according to claim 10, wherein answers to said survey questions are entered into said electronic assemblies via said data input interface.

12. A system for gathering and processing survey data, comprising:
    a first assembly and a separate second assembly capable of being selectively interconnected, wherein said first assembly and said second assembly are identical in shape and are capable of being readily hand held;
    said first assembly and said second assembly containing a display that displays identical survey questions and an answer interface that enables answers to said survey questions to be received;
    wherein answers received by said first assembly and said second assembly are exchanged between said first assembly and said second assembly when said first assembly and said second assembly are interconnected.

13. The system according to claim 12, wherein first assembly and said second assembly contain microprocessors that analyze answers exchanged between said first assembly and said second assembly.

14. The system according to claim 13, wherein said microprocessors identify identical answers exchanged between said first assembly and said second assembly.

15. The system according to claim 12, wherein said survey questions can be answered from a plurality of predetermined answers and both said first assembly and said second assembly include at least one button for selecting from said plurality of predetermined answers.

* * * * *